(12) United States Patent
Chae et al.

(10) Patent No.: US 10,670,115 B2
(45) Date of Patent: Jun. 2, 2020

(54) POWERTRAIN FOR VEHICLE

(71) Applicants: Hyundai Motor Company, Seoul (KR); Kia Motors Corporation, Seoul (KR)

(72) Inventors: Min Ho Chae, Incheon (KR); Yong Uk Shin, Suwon-si (KR); Soon Ki Eo, Ansan-si (KR); Sun Sung Kwon, Anyang-si (KR); Chon Ok Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 15 days.

(21) Appl. No.: 16/255,243

(22) Filed: Jan. 23, 2019

(65) Prior Publication Data
US 2020/0116237 A1    Apr. 16, 2020

(30) Foreign Application Priority Data

Oct. 11, 2018    (KR) .................. 10-2018-0121390

(51) Int. Cl.
*F16H 3/66*    (2006.01)

(52) U.S. Cl.
CPC .......... *F16H 3/666* (2013.01); *B60Y 2200/91* (2013.01); *F16H 2200/0021* (2013.01); *F16H 2200/2007* (2013.01); *F16H 2200/2033* (2013.01); *F16H 2200/2064* (2013.01); *F16H 2200/2094* (2013.01)

(58) Field of Classification Search
CPC ............. F16H 3/666; F16H 2200/2064; F16H 2200/2094; F16H 2200/2007; F16H 2200/2023
See application file for complete search history.

(56) References Cited

U.S. PATENT DOCUMENTS

| 2,588,462 | A | * | 3/1952 | Baker | F02B 33/00 475/286 |
| 4,328,717 | A | * | 5/1982 | Arai | F16H 3/663 475/121 |
| 9,340,101 | B2 | * | 5/2016 | Meissner | F16H 3/725 |
| 2010/0184556 | A1 | * | 7/2010 | Kim | F16H 3/663 475/276 |

FOREIGN PATENT DOCUMENTS

| DE | 102013226471 A1 | * | 6/2015 | ............... F16H 3/66 |
| DE | 102017205118 A1 | * | 9/2018 | ............. B60K 6/445 |
| KR | 10-2012-0118925 A | | 10/2012 | |

* cited by examiner

*Primary Examiner* — Sherry L Estremsky
(74) *Attorney, Agent, or Firm* — Morgan, Lewis & Bockius LLP

(57) ABSTRACT

A powertrain for a vehicle may include a compound planetary gear set configured such that, of four rotation elements, a first rotation element is connected to an input shaft and a second rotation element is connected to an output element; a brake provided to connect a rotating body to a transmission housing to be locked thereto; a first clutch device provided to switch a connection state of the rotating body between a third rotation element and a fourth rotation element of the compound planetary gear set; and a second clutch device provided to switch a connection state of the second rotation element of the compound planetary gear set to the input shaft.

9 Claims, 12 Drawing Sheets

POWERTRAIN FOR VEHICLE

CROSS REFERENCE TO RELATED APPLICATION

The present application claims priority to Korean Patent Application No. 10-2018-0121390, filed Oct. 11, 2018, the entire contents of which is incorporated herein for all purposes by this reference.

BACKGROUND OF THE INVENTION

Field of the Invention

The present invention relates generally to a powertrain for a vehicle. More particularly, the present invention relates to a configuration of a powertrain that can be used in an electric vehicle or the like.

Description of Related Art

An electric vehicle is driven by the power of a motor, and can sufficiently realize the driving characteristics required for a vehicle, such as the maximum gradability of a vehicle and the maximum speed driving ability, while reducing the motor capacity by use of a transmission.

Furthermore, the transmission of a vehicle has low power consumption as much as possible during the implementation of a specific gear stage, to improve the power transmission efficiency of the transmission and ultimately increase driving range of a vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain for a vehicle, in which three gear stages are provided to sufficiently realize the driving characteristics required for a vehicle while reducing the capacity of a motor mounted to the vehicle, and the power transmission efficiency of a transmission is improved by minimizing the power consumed in the implementation of the gear shift, ultimately improving fuel efficiency of the vehicle and increasing the driving range.

In various aspects of the present invention, there is provided a powertrain for a vehicle, the powertrain including: a compound planetary gear set configured such that, of four rotation elements, a first rotation element is connected to an input shaft and a second rotation element is connected to an output element; a brake provided to connect a rotating body to a transmission housing to be locked thereto; a first clutch device provided to switch a connection state of the rotating body between a third rotation element and a fourth rotation element of the compound planetary gear set; and a second clutch device provided to switch a connection state of the second rotation element of the compound planetary gear set to the input shaft.

A first planetary gear set and a second planetary gear set, which are single pinion simple planetary gear sets, may be connected to form the compound planetary gear set; a first sun gear of the first planetary gear set may be the first rotation element; a first planet carrier of the first planetary gear set and a second planet carrier of the second planetary gear set may be connected to form the second rotation element; a first ring gear of the first planetary gear set and a second ring gear of the second planetary gear set may be connected to form the third rotation element; and a second sun gear of the second planetary gear set may be the fourth rotation element.

The rotating body may be provided with a first clutch gear at a radial inside end portion thereof; and the first clutch device may include a sleeve provided with an external sleeve gear on an external circumferential surface thereof to be engaged with the first clutch gear of the rotating body by linearly sliding along an axial direction of the input shaft, and an internal sleeve gear on an internal circumferential surface thereof to be engageable with the third rotation element and the fourth rotation element of the compound planetary gear set.

The third rotation element may be connected to a second clutch gear to be engaged with the internal sleeve gear of the sleeve through the second clutch gear; the fourth rotation element may be connected to a third clutch gear to be engaged with the internal sleeve gear of the sleeve through the third clutch gear; and the second clutch gear and the third clutch gear may be disposed coaxially on opposite sides of the first clutch gear of the rotating body with the first clutch gear disposed therebetween.

The sleeve may linearly slide along the axial direction of the input shaft to sequentially select positions of "2D-2-N-1-1D"; at the N position, the internal sleeve gear of the sleeve may be engaged with neither the second clutch gear nor the third clutch gear, and the external sleeve gear may be engaged with the first clutch gear; at the 1 position, the internal sleeve gear of the sleeve may be engaged with the second clutch gear, and the external sleeve gear may be engaged with the first clutch gear; at the 1D position, the internal sleeve gear of the sleeve may be engaged with the second clutch gear, and the external sleeve gear may be disengaged from the first clutch gear and be engaged with a fourth clutch gear fixedly provided in the transmission housing; at the 2 position, the internal sleeve gear of the sleeve may be engaged with the third clutch gear, and the external sleeve gear may be engaged with the first clutch gear; and at the 2D position, the internal sleeve gear of the sleeve may be engaged with the third clutch gear, the external sleeve gear may be disengaged from the first clutch gear, and an additional external gear integrally provided in the sleeve may be engaged with the fourth clutch gear.

The sleeve may be slidable along the axial direction of the input shaft by a shift fork driven by an actuator.

Each of the first clutch device and the second clutch device may be constituted by a mesh type clutch to realize power transmission by gear engagement.

According to an exemplary embodiment of the present invention, it is advantageous in that three gear stages are provided to sufficiently realize the driving characteristics required for a vehicle while reducing the capacity of a motor mounted to the vehicle, and the power transmission efficiency of a transmission is improved by minimizing the power consumed in the implementation of the gear shift, ultimately improving fuel efficiency of the vehicle and increasing the driving range.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
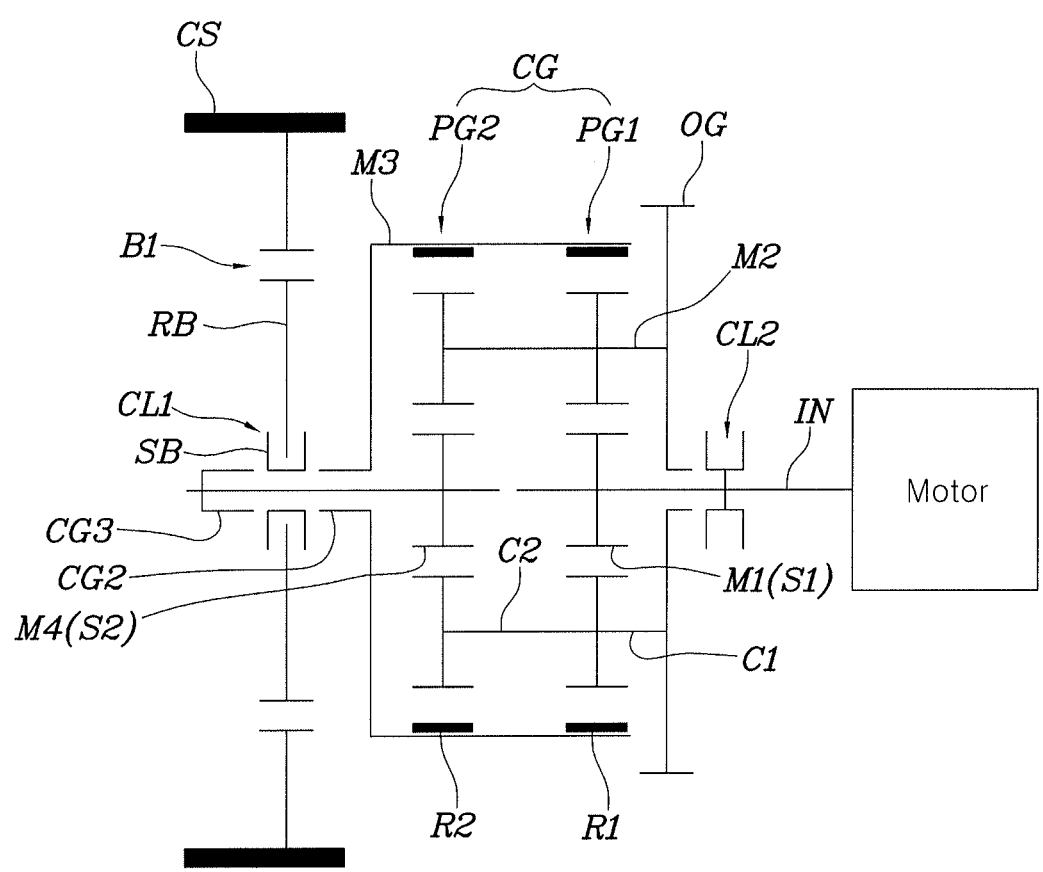
FIG. 1 is a view showing a configuration of a powertrain for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, an automatic transmission for a vehicle according to an exemplary embodiment of the present invention will be described in detail with reference to the accompanying drawings.

Figure 2:
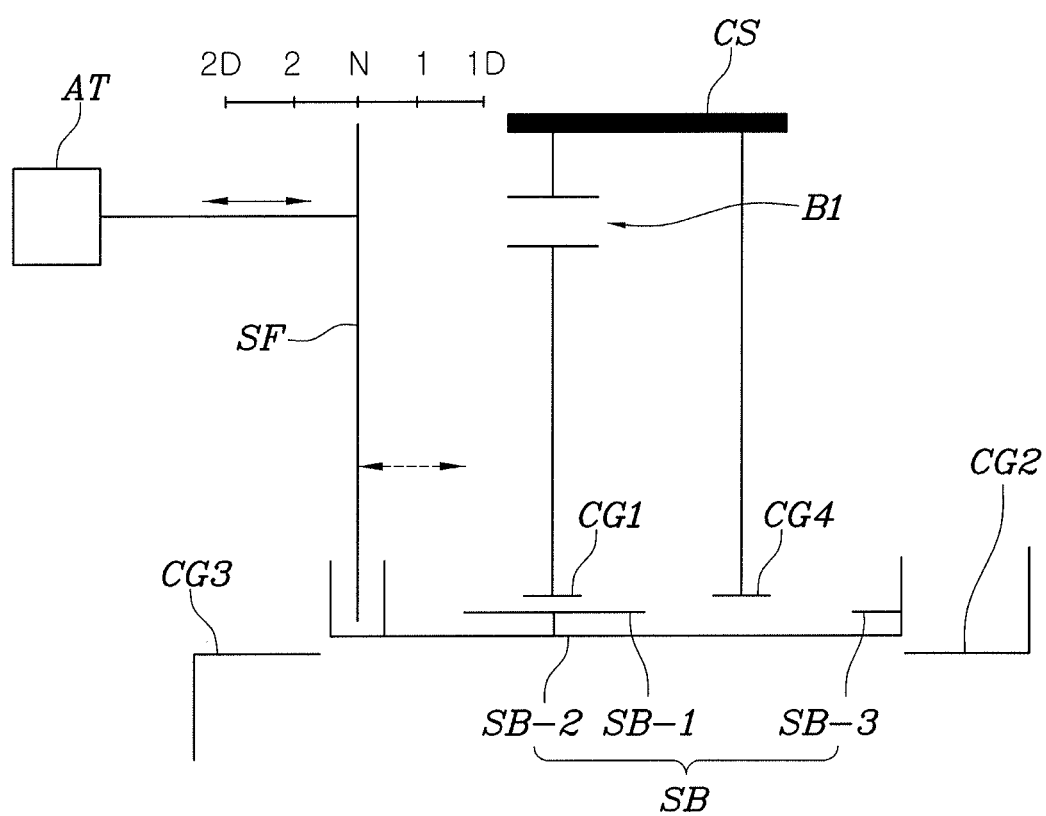
FIG. 2 is a detailed view showing a first clutch device of FIG. 1.

Referring to FIG. 1 and FIG. 2, an exemplary embodiment of a powertrain for a vehicle of the present invention includes: a compound planetary gear set CG configured such that of four rotation elements, a first rotation element M1 is connected to an input shaft IN and a second rotation element M2 is connected to an output element; a brake B1 provided to connect a rotating body RB to a transmission housing CS to be locked thereto; a first clutch device CL1 provided to switch a connection state of the rotating body RB between a third rotation element M3 and a fourth rotation element M4 of the compound planetary gear set CG; and a second clutch device CL2 provided to switch a connection state of the second rotation element M2 of the compound planetary gear set CG to the input shaft IN.

A motor is connected to the input shaft IN, and the power of the motor is input to the input shaft IN.

A first planetary gear set PG1 and a second planetary gear set PG2, which are single pinion simple planetary gear sets, are connected to form the compound planetary gear set CG.

In other words, the compound planetary gear set CG with four rotation elements is formed by combining the rotation elements of the first planetary gear set PG1 and the second planetary gear set PG2, each of which has three rotation elements.

In the exemplary embodiment of the present invention, a first sun gear S1 of the first planetary gear set PG1 is the first rotation element M1; a first planet carrier C1 of the first planetary gear set PG1 and a second planet carrier C2 of the second planetary gear set PG2 are connected to form the second rotation element M2; a first ring gear R1 of the first planetary gear set PG1 and a second ring gear R2 of the second planetary gear set PG2 are connected to form the third rotation element M3; and a second sun gear S2 of the second planetary gear set PG2 is the fourth rotation element M4.

The rotating body RB fixable to the transmission housing CS by the brake B1 is provided with a first clutch gear CG1 at a radial inside end portion thereof.

The first clutch device CL1 includes a sleeve SB provided with an external sleeve gear SB-1 on an external circumferential surface thereof to be engaged with the first clutch gear CG1 of the rotating body RB by linearly sliding along an axial direction of the input shaft IN, and an internal sleeve gear SB-2 on an internal circumferential surface thereof to be engageable with the third rotation element M3 and the fourth rotation element M4 of the compound planetary gear set CG.

In the exemplary embodiment of the present invention, the third rotation element M3 is connected to a second clutch gear CG2 to be engaged with the internal sleeve gear SB-2 of the sleeve SB through the second clutch gear CG2; the fourth rotation element M4 is connected to a third clutch gear CG3 to be engaged with the internal sleeve gear SB-2 of the sleeve SB through the third clutch gear CG3; and the second clutch gear CG2 and the third clutch gear CG3 are disposed coaxially on opposite sides of the first clutch gear CG1 of the rotating body RB with the first clutch gear disposed therebetween.

Accordingly, when the sleeve SB is moved to the right in the drawing, the internal sleeve gear SB-2 is engaged with the second clutch gear CG2 to connect the third rotation element M3 to the rotating body RB, and when the sleeve SB is moved to the left, the internal sleeve gear SB-2 is engaged with the third clutch gear CG3 to connect the fourth rotation element M4 to the rotating body RB.

The sleeve SB linearly slides along the axial direction of the input shaft IN to sequentially select positions of "2D-2-N-1-1D".

At the N position, which is neutral, the internal sleeve gear SB-2 of the sleeve SB is engaged with neither the second clutch gear CG2 nor the third clutch gear CG3, and the external sleeve gear SB-1 is engaged with the first clutch gear CG1.

At the '1' position, where the first gear stage is implemented, the internal sleeve gear SB-2 of the sleeve SB is engaged with the second clutch gear CG2, and the external sleeve gear SB-1 is engaged with the first clutch gear CG1.

At the '1D' position, where the first gear stage is implemented even when the brake B1 is released, the internal sleeve gear SB-2 of the sleeve SB is engaged with the second clutch gear CG2, and the external sleeve gear SB-1 is disengaged from the first clutch gear CG1 and is engaged with a fourth clutch gear CG4 fixedly provided in the transmission housing CS.

At the '2' position, where the second gear stage is implemented, the internal sleeve gear SB-2 of the sleeve SB is engaged with the third clutch gear CG3, and the external sleeve gear SB-1 is engaged with the first clutch gear CG1.

At the '2D' position, where the second gear stage is implemented even when the brake B1 is released, the internal sleeve gear SB-2 of the sleeve SB is engaged with the third clutch gear CG3, the external sleeve gear SB-1 is disengaged from the first clutch gear CG1, and an additional external gear SB-3 integrally provided in the sleeve SB is engaged with the fourth clutch gear CG4.

For reference, in the exemplary embodiment of the present invention, although it is shown that the internal sleeve gear SB-2 of the sleeve SB is formed in a single body, whereby when it is moved to the right, it is engaged with the second clutch gear CG2, and when moved to the left, it is engaged with the third clutch gear CG3, it may be configured such that a portion engaged with the second clutch gear CG2 and another portion engaged with the third clutch gear CG3 are separately provided.

The sleeve SB is provided to be slidable along the axial direction of the input shaft IN by a fork SF driven by an actuator AT, and the actuator AT is, of course, configured to be controlled by a controller not shown.

Each of the first clutch device CL1 and the second clutch device CL2 is formed by a mesh type clutch to realize power transmission by gear engagement.

Herein, the mesh type clutch, such as a dog clutch and a synchromesh device, means a mechanism having a structure in which gears are engaged with each other to transmit power in a power transmission state, and gears are disengaged from each other when power is interrupted.

Figure 3:
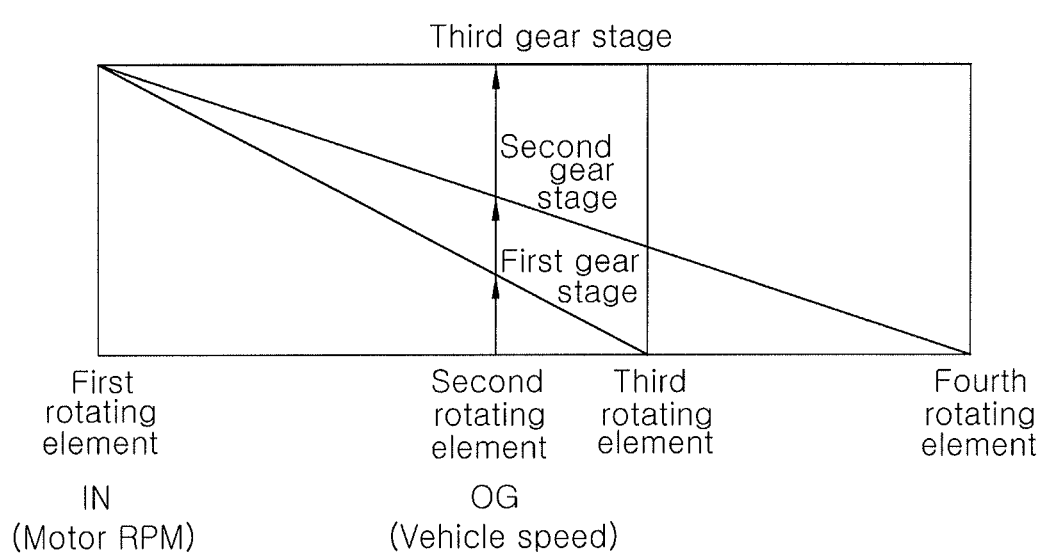
FIG. 3 is a lever diagram showing operation of the powertrain for a vehicle according to an exemplary embodiment of the present invention.

FIG. 3 is a lever diagram implicatively showing the state where the powertrain of the present invention configured as described above forms each gear stage.

Figure 4:
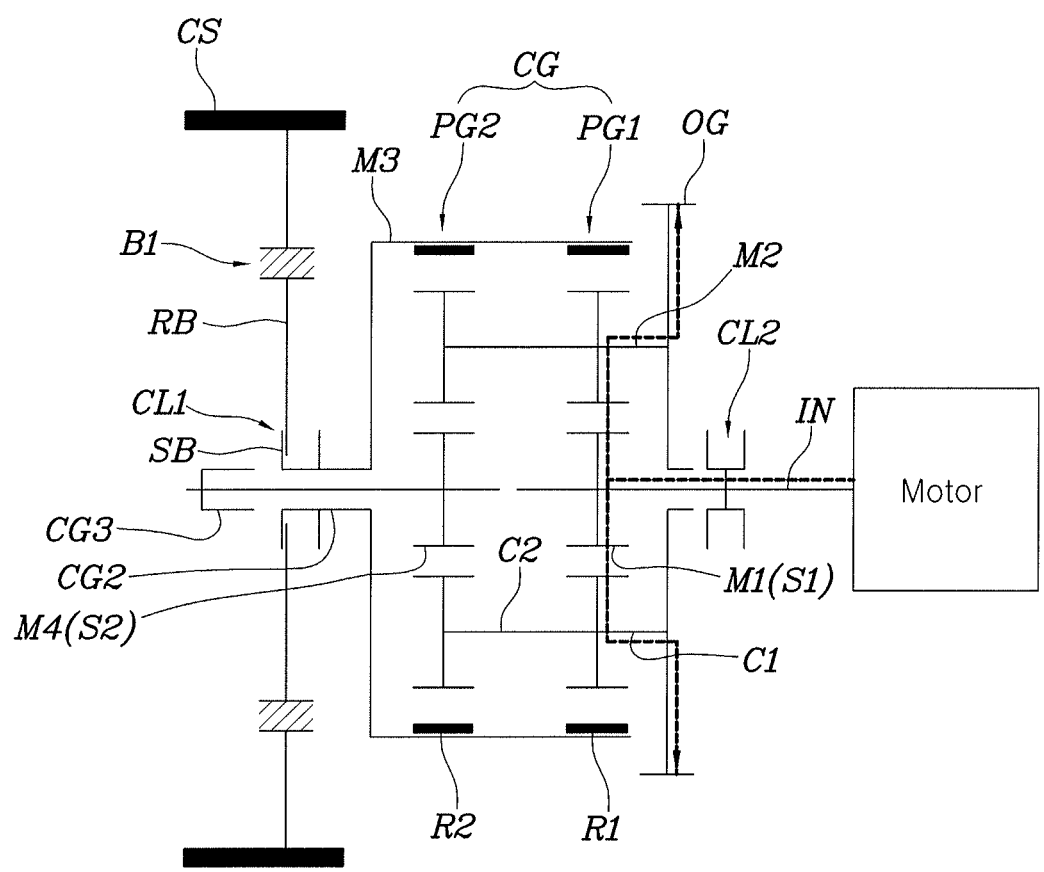
FIG. 4 is a view showing a state where the powertrain of the present invention implements 1-stage.
Figure 5:
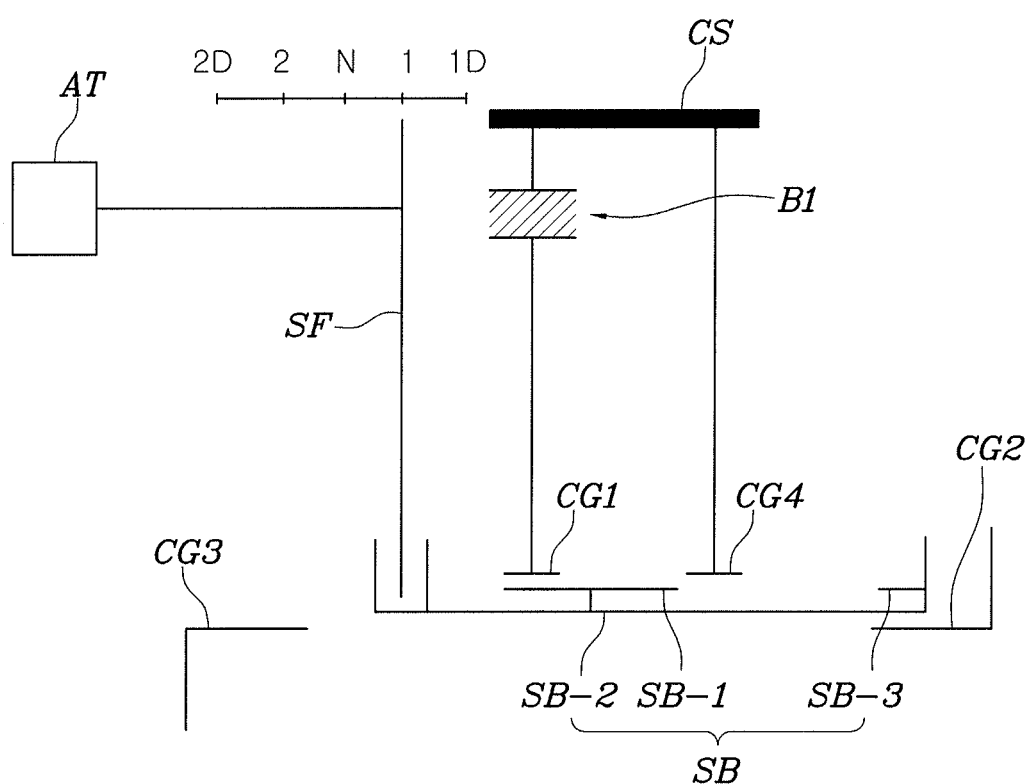
FIG. 5 is a view showing a state of the first clutch device when 1-stage is implemented.

FIG. 4 and FIG. 5 are views showing the state of forming the first gear stage, when the sleeve SB is moved from the state of FIG. 1 to the right to be disposed at the '1' position, the internal sleeve gear SB-2 is engaged with the second clutch gear CG2 in the state where the external sleeve gear SB-1 is engaged with the first clutch gear CG1. Here, the brake B1 locks the rotating body RB to the transmission housing CS, locking the second clutch gear CG2.

As described above, when the second clutch gear CG2 is locked, the first ring gear R1 and the second ring gear R2, which form the third rotation element M3, directly connected thereto are locked, the power input from the input shaft IN to the first sun gear S1, which forms the first rotation element M1, is decelerated and is output through the first planet carrier C1 and the second planet carrier C2, which form the second rotation element M2, while forming a first gear ratio.

For reference, since the second rotation element M2 having the first planet carrier C1 and the second planet carrier C2 is integrally provided with an output gear OG as the output element, it is possible to output the power to a differential and the like through the output gear OG.

Figure 6:
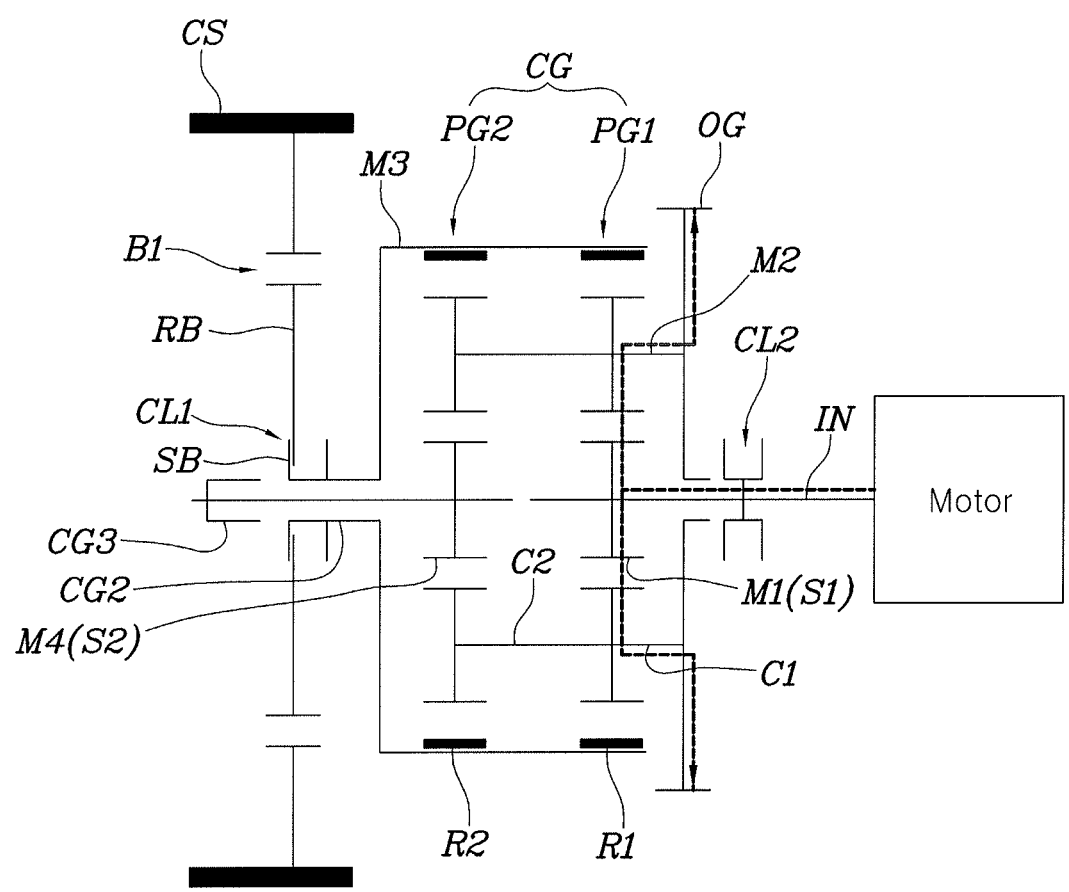
FIG. 6 is a view showing a state where the powertrain of the present invention implements 1D-stage.
Figure 7:
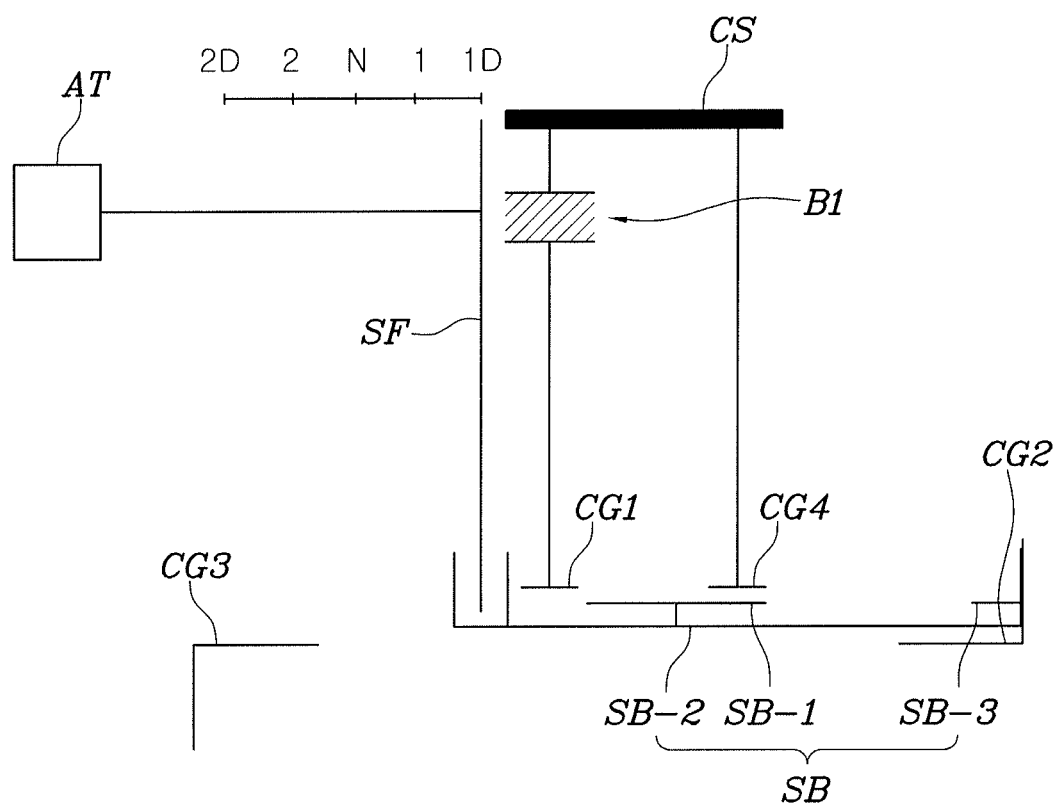
FIG. 7 is a view showing a state of the first clutch device when 1D-stage is implemented.

FIG. 6 and FIG. 7 are views showing the '1D' state where the first gear stage is continuously maintained even when the brake B1 is released.

From the '1' state, when the sleeve SB is moved to the right by driving the actuator AT and then the brake B1 is released, the '1D' state is implemented.

In other words, when the external sleeve gear SB-1 of the sleeve SB is released from the first clutch gear CG1 and is engaged with the fourth clutch gear CG4, and the internal sleeve gear SB-2 maintains the state of being engaged with the second clutch gear CG2, the third rotation element M3 connected to the second clutch gear CG2 continuously maintains the state of being locked to the transmission housing CS by the sleeve SB and the fourth clutch gear CG4, whereby it is possible to continuously maintain the first gear stage.

Here, since it is fine that the brake B1 is released, the energy required to keep the brake B1 in the engaged state is not required in the present state, and accordingly, the power transmission efficiency of the transmission is improved, and the fuel efficiency of the vehicle and the driving range are increased.

Figure 8:
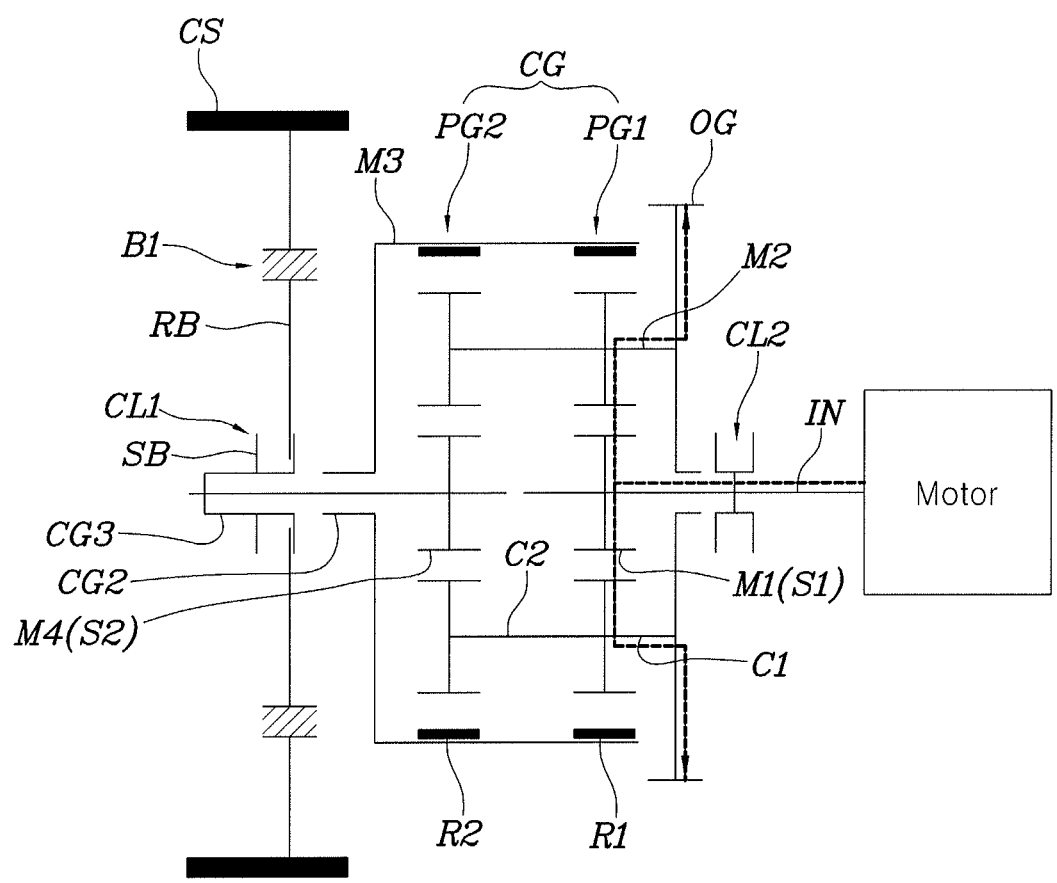
FIG. 8 is a view showing a state where the powertrain of the present invention implements 2-stage.
Figure 9:
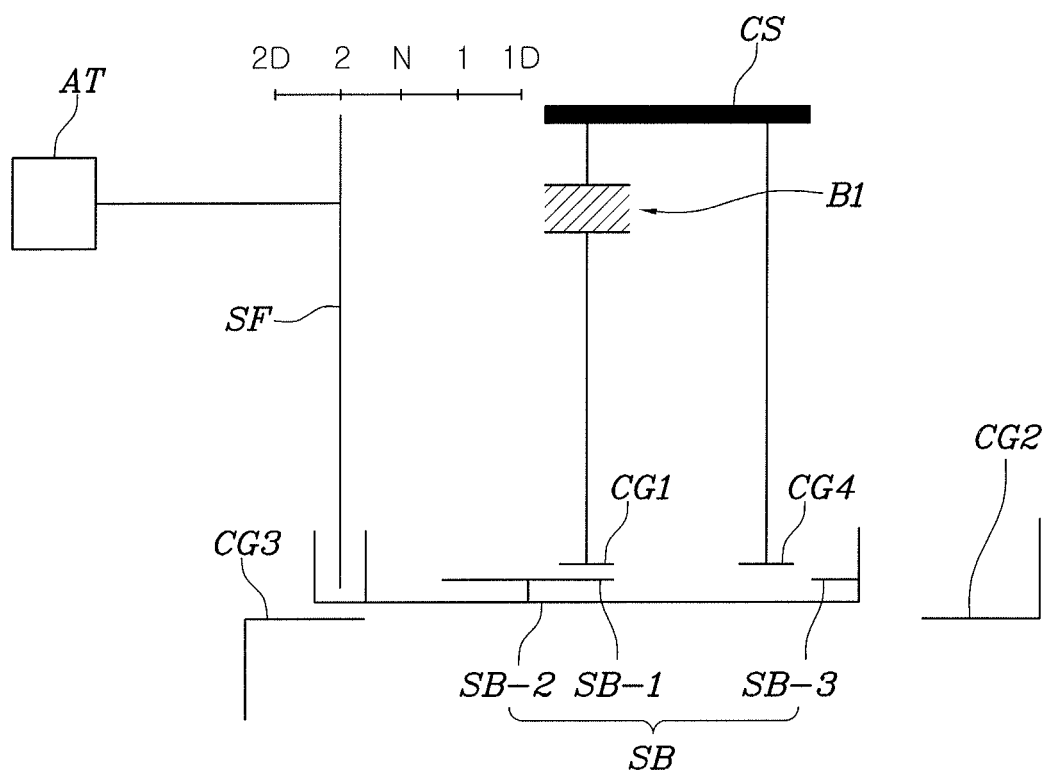
FIG. 9 is a view showing a state of the first clutch device when 2-stage is implemented.

To implement the second gear stage, the sleeve SB is moved to the left and is sequentially moved to the 1, N, and 2 positions. At the '1' position, the brake B1 is in the slip control state while the brake B1 is engaged to form the first gear stage, and after the number of rotations of the motor is adjusted to synchronize the rotation speed of the fourth rotation element M4 and the sleeve SB, as shown in FIG. 8 and FIG. 9, the sleeve SB is moved to the '2' position such that the internal sleeve gear SB-2 is engaged with the third clutch gear CG3.

As described above, when the internal sleeve gear SB-2 is engaged with the third clutch gear CG3, the brake B1 is fully engaged again to implement the second gear stage.

In other words, when the brake B1 is fully engaged, the second sun gear S2 as the fourth rotation element M4 is locked through the sleeve SB, the power input into the first sun gear S1 is output through the output gear OG while forming the second gear stage.

Figure 10:
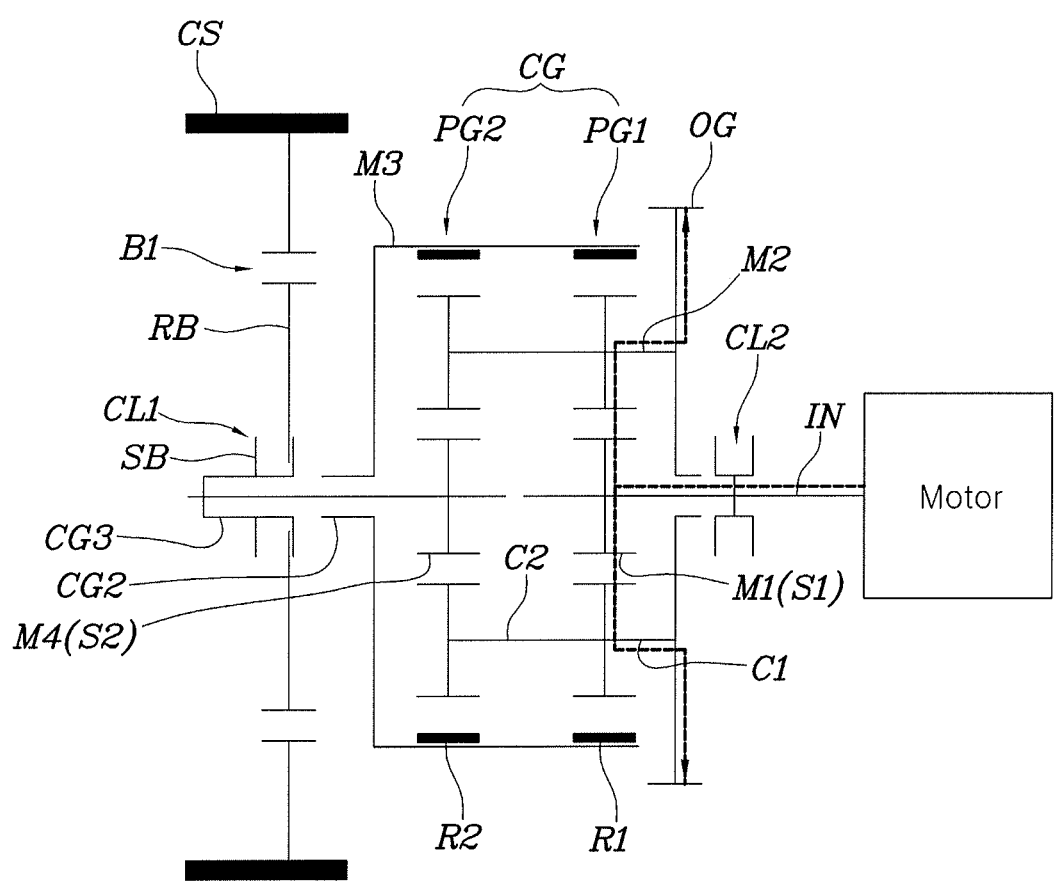
FIG. 10 is a view showing a state where the powertrain of the present invention implements 2D-stage.
Figure 11:
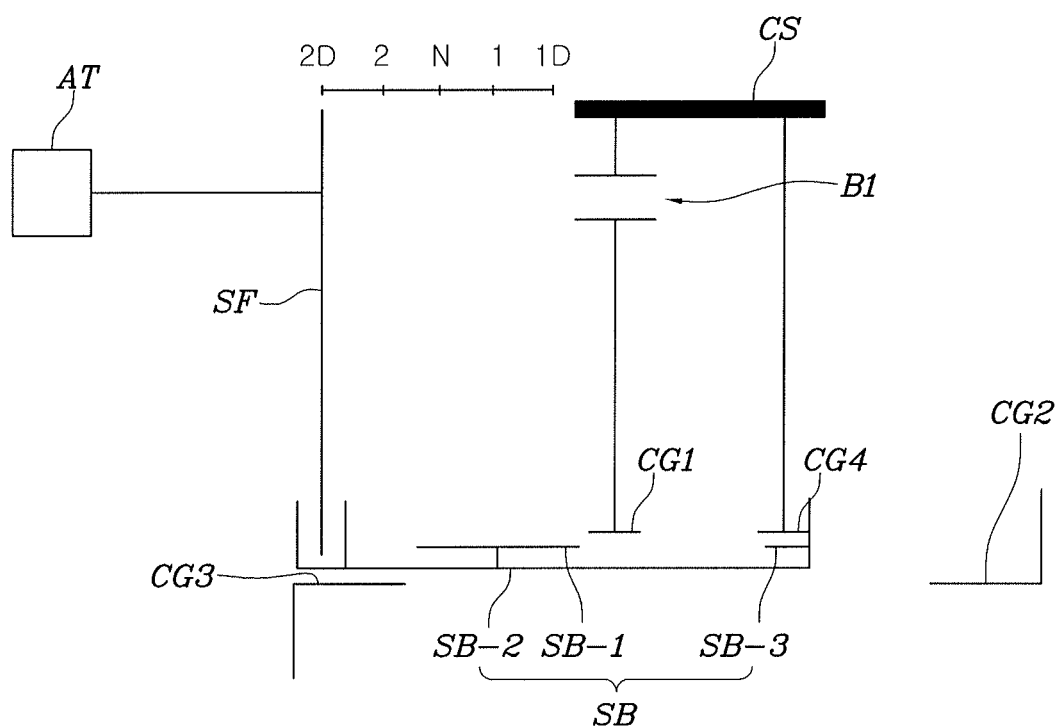
FIG. 11 is a view showing a state of the first clutch device when 2D-stage is implemented.

FIG. 10, and FIG. 11 are views showing the '2D' state, in which the sleeve SB is moved one step from the '2' state to the left, and the brake B1 is released.

In the instant state, the internal sleeve gear SB-2 maintains the state of being engaged with the third clutch gear CG3, and the additional external gear SB-3 of the sleeve SB is engaged with the fourth clutch gear CG4 to lock the sleeve SB, and accordingly, it is possible to continuously secure the locked state of the fourth rotation element M4 even after the brake B1 is released.

Also in the instant state, as in the '1D' state, it is possible to save required to engage the energy brake B1, whereby fuel efficiency of the vehicle is improved and the driving range is increased.

Figure 12:
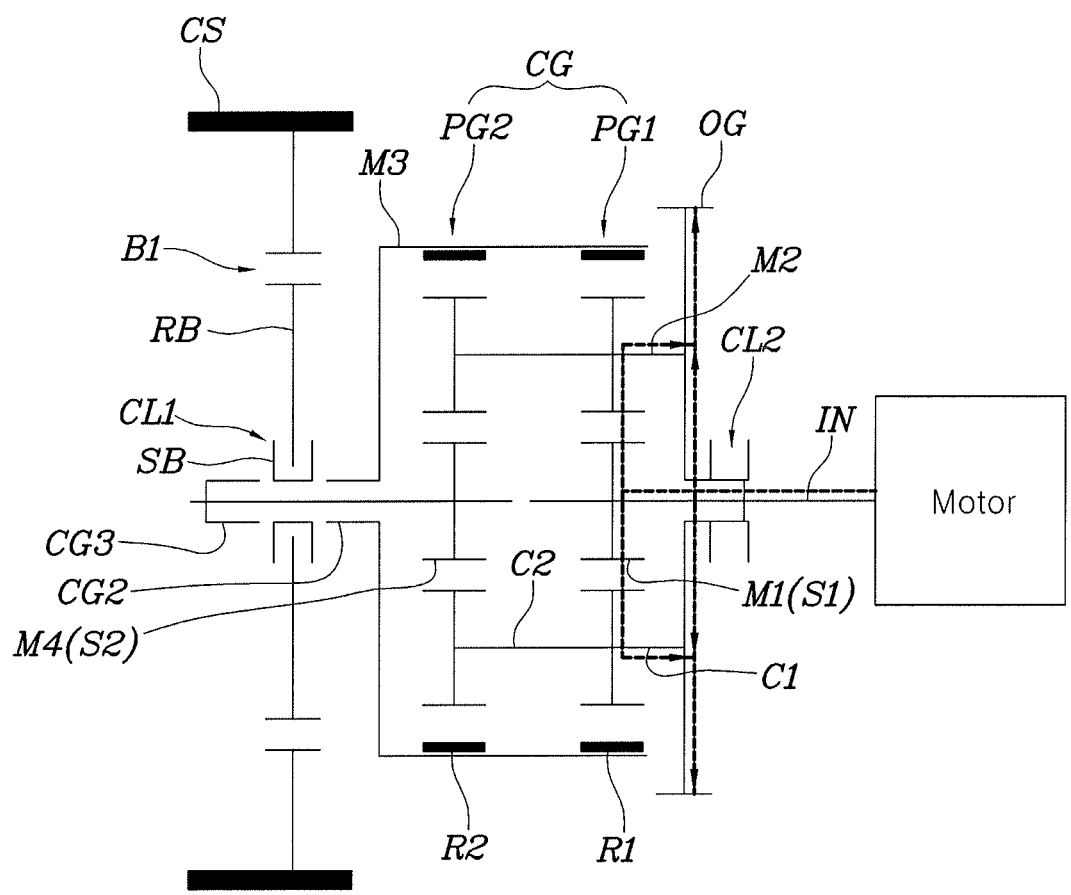
FIG. 12 is a view showing a state where the powertrain of the present invention implements 3-stage.

FIG. 12 is a view showing the state where the powertrain of the present invention forms the third gear stage. Here, the first clutch device CL1 is converted into the neutral state as shown in FIG. 1, and the second rotation element M2 is directly connected to the input shaft IN by the second clutch device CL2, implementing the third gear stage.

In other words, when the second clutch device CL2 directly connects the second rotation element M2 to the input shaft IN, the first rotation element M1 of the compound planetary gear set CG and the second rotation element M2 are connected to each other accordingly, and all the rotation elements of the compound planetary gear set CG rotate at the same rotation speed, and thus, the power of the motor input into the first rotation element M1 through the input shaft IN is output through the output gear OG directly connected to the second rotation element M2 while forming 1:1 gear ration.

For reference, when shifting between gear stages, such as second to third gear, third to second gear, second to first gear, as in shifting from the first to second gear described above, by controlling the brake B1 slip and the number of rotations of the motor, the rotation speeds of the sleeve SB and the object to be engaged with the sleeve SB are synchronized and engaged with each other, whereby shifting is performed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain for a vehicle, the powertrain comprising:
   a compound planetary gear set including first, second, third, and fourth rotation elements, wherein the first rotation element is connected to an input shaft and the second rotation element is connected to an output element;
   a brake provided to selectively connect a rotating body to a transmission housing to be locked thereto;
   a first clutch device provided to selectively switch a connection state of the rotating body between the third rotation element and the fourth rotation element of the compound planetary gear set; and
   a second clutch device provided to selectively switch a connection state of the second rotation element of the compound planetary gear set to the input shaft.

2. The powertrain of claim 1,
   wherein a first planetary gear set and a second planetary gear set, which are single pinion simple planetary gear sets, are connected to form the compound planetary gear set,
   wherein a first sun gear of the first planetary gear set is the first rotation element,
   wherein a first planet carrier of the first planetary gear set engaged to the first sun gear of the first planetary gear set and a second planet carrier of the second planetary gear set are connected to form the second rotation element,
   wherein a first ring gear of the first planetary gear set engaged to the first planet carrier of the first planetary gear set and a second ring gear of the second planetary gear set engaged to the second planet carrier of the first planetary gear set are connected to form the third rotation element, and
   wherein a second sun gear of the second planetary gear set engaged to the second planet carrier of the first planetary gear set is the fourth rotation element.

3. The powertrain of claim 1,
   wherein the rotating body is provided with a first clutch gear at a radial inside end portion thereof; and
   wherein the first clutch device includes a sleeve provided with an external sleeve gear on an external circumferential surface thereof to be selectively engaged with the first clutch gear of the rotating body by linearly sliding along an axial direction of the input shaft, and an internal sleeve gear on an internal circumferential surface thereof to be engageable with the third rotation element or the fourth rotation element of the compound planetary gear set.

4. The powertrain of claim 3,
   wherein the third rotation element is connected to a second clutch gear to be selectively engaged with the internal sleeve gear of the sleeve through the second clutch gear, and
   wherein the fourth rotation element is connected to a third clutch gear to be selectively engaged with the internal sleeve gear of the sleeve through the third clutch gear.

5. The powertrain of claim 4, wherein the second clutch gear and the third clutch gear are mounted coaxially on a first opposite side and a second opposite side of the first clutch gear of the rotating body with the first clutch gear mounted therebetween.

6. The powertrain of claim 4,
   wherein the sleeve linearly slides along the axial direction of the input shaft to sequentially select a position of an additional second gear stage (2D) position, a second gear stage (2) position, a neutral stage (P) position, a first gear stage (1) position, and an additional first gear stage (1D) position,
   wherein at the N position, the internal sleeve gear of the sleeve is engaged with neither the second clutch gear nor the third clutch gear, and the external sleeve gear is engaged with the first clutch gear,
   wherein at the 1 position, the internal sleeve gear of the sleeve is engaged with the second clutch gear and disengaged from the third clutch gear, and the external sleeve gear is engaged with the first clutch gear,
   wherein at the 1D position, the internal sleeve gear of the sleeve is engaged with the second clutch gear and disengaged from the third clutch gear, and the external sleeve gear is disengaged from the first clutch gear and is engaged with a fourth clutch gear fixedly provided in the transmission housing,
   wherein at the 2 position, the internal sleeve gear of the sleeve is disengaged from the second clutch gear and engaged with the third clutch gear, and the external sleeve gear is engaged with the first clutch gear, and
   wherein at the 2D position, the internal sleeve gear of the sleeve is disengaged from the second clutch gear and engaged with the third clutch gear, the external sleeve gear is disengaged from the first clutch gear, and an additional external gear integrally provided in the sleeve is engaged with the fourth clutch gear.

7. The powertrain of claim 6, wherein the sleeve is slidable along the axial direction of the input shaft by a shift fork driven by an actuator.

8. The powertrain of claim 1, wherein each of the first clutch device and the second clutch device is formed by a mesh type clutch to realize power transmission by a gear engagement.

9. The powertrain of claim 1, wherein a motor is connected to the input shaft.

\* \* \* \* \*